Sept. 3, 1929.  I. YASSENOFF  1,726,875
ENGINE SHAFT
Filed Nov. 6, 1926  2 Sheets-Sheet 1
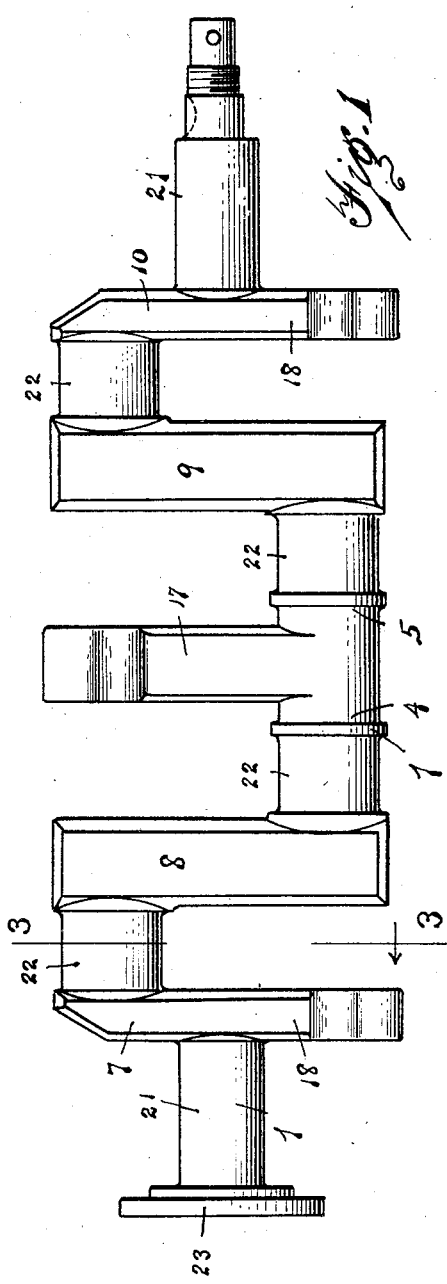
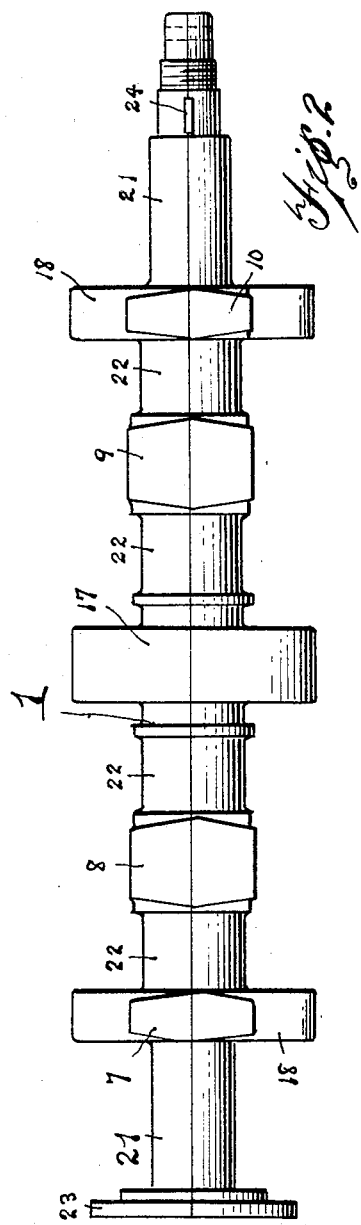
INVENTOR.
I. Yassenoff
BY
Edward N. Pagelsen,
ATTORNEY.

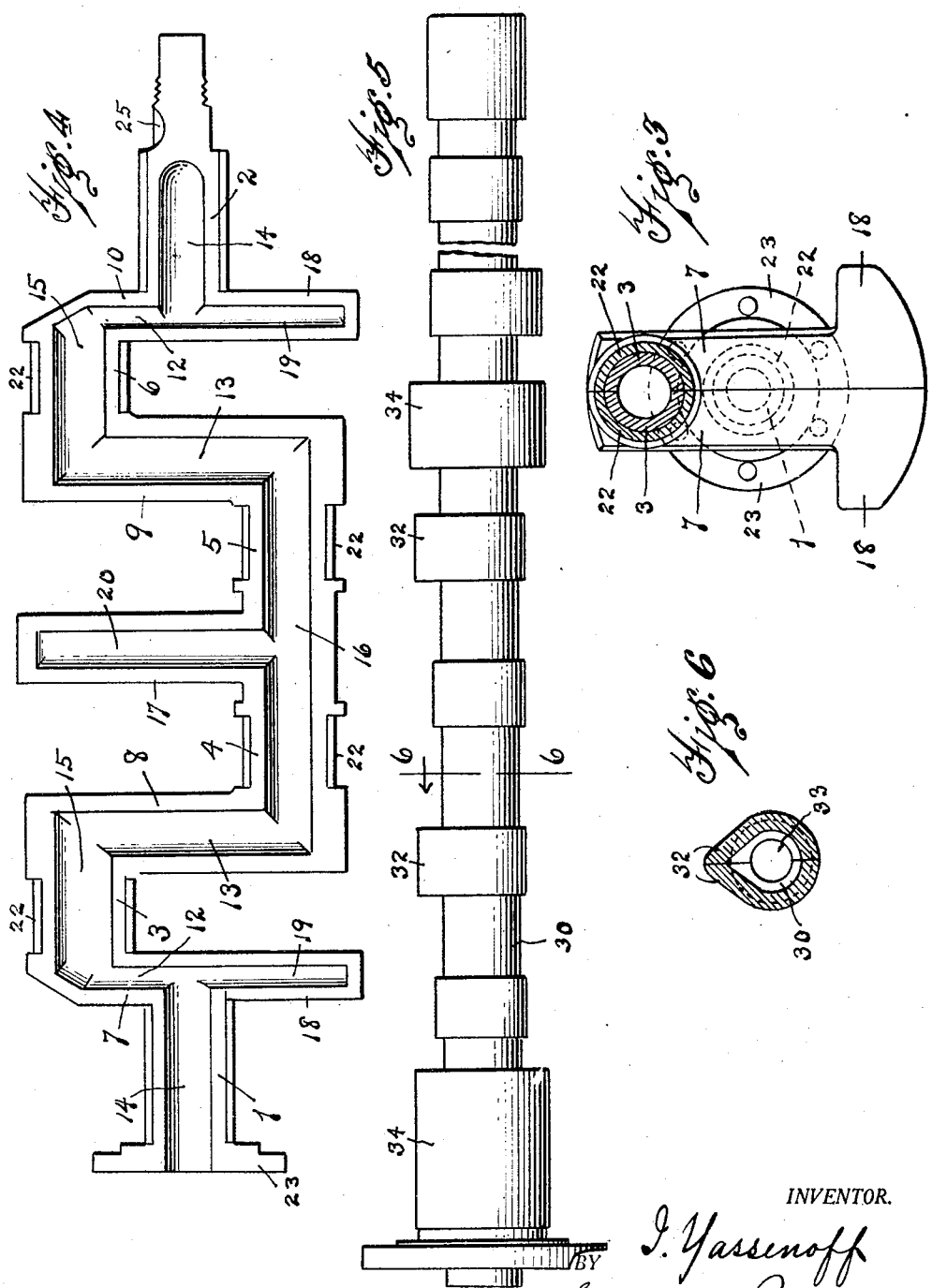

Patented Sept. 3, 1929.

1,726,875

UNITED STATES PATENT OFFICE.

ISIDOR YASSENOFF, OF DETROIT, MICHIGAN.

ENGINE SHAFT.

Application filed November 6, 1926. Serial No. 146,650.

This invention relates to the construction of engine shafts, that is both crank and cam shafts of internal combustion engines and the crank shafts of reciprocating steam engines, and its object is to provide constructions of this character which will have maximum strength for weight and whose bearing surface will offer maximum resistance to abrasion.

Crank shafts and cam shafts should have certain very important characteristics:—first, they should be of very tough metal that will not readily crystallize because of the infinite number of transverse stresses to which such shafts are subjected; second, the bearing surfaces should have a maximum area and be very hard so that they will resist wear a maximum length of time; third, the diameters of the shafts between bearings should be as large as possible in order to prevent deflexion as much as possible. I am able to incorporate these characteristics by forming the shafts with large central bores which communicate with similar recesses in the cranks and crank pins, thereby giving these several parts maximum transverse strength for the amount of metal therein, and by securing thin shells of tempered or temperable metal at proper locations to constitute the bearing surfaces, the remainders of the shafts being of tough unhardened metal. My invention consists therefore in building shafts of this character from two longitudinal halves united together, and it also consists in integrally uniting bearing surfaces to the surfaces of the thus built-up shafts.

In the accompanying drawings, Fig. 1 is a plan of a shaft for a four cylinder internal combustion engine, and Fig. 2 is a side elevation thereof. Fig. 3 is a section on the line 3—3 of Fig. 1. Fig. 4 is a plan of one of the halves employed to build up the shaft shown in Figs. 1 and 2. Fig. 5 is a plan of a cam shaft embodying the present invention. Fig. 6 is a section in the line 6—6 of Fig. 5.

Similar reference characters refer to like parts throughout the several views.

The well known rule that the strength of a hollow cylindrical beam resists bending to a much greater degree than a solid cylindrical beam of the same weight underlies the present idea of forming shafts from two forgings or stampings having comparatively thin walls. In Figs. 1 to 3 inclusive, the crank shaft shown is built up from two halves, one of which is shown in Fig. 4, the other being a complement of it. The half-shaft consists of the semi-cylindrical shaft members 1 and 2, the semi-cylindrical crank pin members 3, 4, 5 and 6, the crank members 7, 8, 9 and 10 which have parallel sides and recesses 12 and 13 which connect the recesses 14 in the semi-cylindrical end members with similar recesses 15 and 16 in the crank pin members. I have also shown counter-weight members 17 and 18 having recesses 19 and 20 connecting to the recesses 12 and 16 respectively. The material for these shaft members is preferably tough, non-tempering, low-carbon steel. After these two half-shafts are formed, they are united to produce the shaft 21 in any desired manner, electric spot or butt welding, arc welding, or acetylene welding being employed. Pairs of semi-cylindrical shells 21 and 22 of temperable metal or case hardened steel or air tempering steel may then be secured to the shaft to constitute bearing surfaces. If these surfaces are hardened and tempered in place, the shaft itself may readily be relieved of all bends or twists taken on during such heat treatment. All the advantages of hard bearings and soft shafting is therefore obtained. The coupling disk 23 is formed on the half-shafts in any desired manner, and after the shaft is built up, a key 24 may be secured in the notch 25.

A crank shaft thus constructed is very light for its strength and has a series of connected passages extending through its length for the passage of lubricant, and as these passages are of comparatively large diameter, the crank shaft will act as a reservoir for its own lubricant. The tedious and expensive work of drilling the crank shaft for its oil passages is therefore avoided and the present passages are of such size that they will not become clogged.

In Figs. 5 and 6 I show a cam shaft 30 formed of two halves, the cams 32 being formed on the two halves during the initial forging, the shaft having a central passage 33, after the two halves have been united as above described, semi-cylindrical shells 34 of proper metal for the bearings may be attached thereto, after which the shaft is straightened if necessary, and the bearings and cams finally ground to exact limits.

Shafts constructed as above described possess all necessary strength and durablity so as to withstand the stresses to which such shafts are subjected, but will be exceptionally light by reason of the method employed in their production. The invention may be practiced with equal facility in the production of shafts for many purposes but is not limited thereto but is addressed to shafting generally, irrespective of their use. The details of construction, therefore, and the proportions of the parts may all be changed by those skilled in the art without departing from the spirit of my invention as set forth in the following claims.

I claim:—

1. A shaft consisting of an untempered hollow body composed of a pair of duplicate non-temperable sections welded together, and tempered bearing sleeves welded to said body at localized positions thereon.

2. A shaft consisting of a non-temperable hollow body formed from a pair of duplicate sections welded together along their longitudinal meeting faces, and tempered bearing sleeves welded to said body at various positions thereon.

3. A shaft consisting of a hollow body formed from two duplicate sections of untemperable metal and subsequently united by welding, and tempered bearing sleeves each consisting of two duplicate sections welded at various positions to said body.

4. A hollow crank shaft embodying tough non-temperable metal shaft portions, cranks and crank pins, and tempered shells encasing the shaft portions and crank pins to constitute bearing surfaces and welded thereto.

5. A shaft comprising a soft non-temperable metal body and shells of tempered metal encasing the body at spaced intervals and welded thereto.

ISIDOR YASSENOFF.